United States Patent
Guering et al.

(10) Patent No.: US 11,167,838 B2
(45) Date of Patent: Nov. 9, 2021

(54) RUDDER CONTROL UNIT HAVING A SINGLE-PIECE MAIN MODULE MOBILE ON A CURVED SUPPORT FRAME

(71) Applicant: Airbus Operations (S.A.S.), Toulouse (FR)

(72) Inventors: Bernard Guering, Montrabe (FR); Laurent Saint-Marc, Montaigut sur Save (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 253 days.

(21) Appl. No.: 16/417,744

(22) Filed: May 21, 2019

(65) Prior Publication Data

US 2019/0359320 A1    Nov. 28, 2019

(30) Foreign Application Priority Data

May 22, 2018    (FR) ...................................... 18 54220

(51) Int. Cl.
| | |
|---|---|
| *B64C 13/04* | (2006.01) |
| *B64C 9/02* | (2006.01) |
| *B64C 13/06* | (2006.01) |
| *B64C 13/12* | (2006.01) |

(52) U.S. Cl.
CPC .............. *B64C 13/044* (2018.01); *B64C 9/02* (2013.01); *B64C 13/06* (2013.01); *B64C 13/12* (2013.01)

(58) Field of Classification Search
CPC .............................. B64C 13/044; B64C 13/06
See application file for complete search history.

(56) References Cited

U.S. PATENT DOCUMENTS

| | | | |
|---|---|---|---|
| 3,129,605 A | 4/1964 | Bonnell, Jr. et al. | |
| 3,359,821 A | 12/1967 | Beardsley et al. | |
| 4,484,722 A | 11/1984 | Larson et al. | |
| 10,196,130 B2 * | 2/2019 | Gemmati | B64C 13/06 |
| 2011/0108674 A1 * | 5/2011 | Gardner | B64C 13/044 244/235 |
| 2014/0131523 A1 * | 5/2014 | Carner | B64C 13/06 244/235 |
| 2014/0251066 A1 * | 9/2014 | Stachniak | B64C 13/044 74/512 |
| 2016/0348772 A1 * | 12/2016 | Petrou | B64C 13/044 |
| 2017/0166296 A1 | 6/2017 | Guering et al. | |

FOREIGN PATENT DOCUMENTS

| | | |
|---|---|---|
| EP | 3 124 378 A1 | 2/2017 |
| FR | 3 045 006 B1 | 1/2018 |

OTHER PUBLICATIONS

French Search Report for Application No. 1854220 dated Jan. 17, 2019.

* cited by examiner

*Primary Examiner* — Richard G Davis
(74) *Attorney, Agent, or Firm* — Jenkins, Wilson, Taylor & Hunt, P.A.

(57) ABSTRACT

A rudder control unit includes a single-piece main module mobile on a curved support frame. The rudder control unit includes a curved support and guide frame to be mounted in a floor of the aircraft, and a unique main module including the pedals and a set of functionalities, the main module configured such that it is movable and positioned on the support and guide frame using a movement unit, thus making it possible to obtain an extremely simplified architecture with a reduced number of pieces.

20 Claims, 6 Drawing Sheets

RUDDER CONTROL UNIT HAVING A SINGLE-PIECE MAIN MODULE MOBILE ON A CURVED SUPPORT FRAME

CROSS-REFERENCE TO RELATED APPLICATION

This application claims priority to French Patent Application 18 54220 filed May 22, 2018, the entire disclosure of which is incorporated by reference herein.

TECHNICAL FIELD

The disclosure herein relates to a rudder control unit for an aircraft, in particular for a transport plane, and an aircraft including such a rudder control unit.

On an aircraft, a rudder control unit is a mechanical device which allows the pilot and co-pilot to command the rudder and the wheel brakes.

The rudder control unit comprises pedals and an assembly of mobile pieces which, depending on the types of movements that are applied to the pedals by the pilot or pilots, command the rudder or the brakes of the aircraft.

BACKGROUND

The rudder control units used on aircraft are, mainly on airliners, rudder control units integrated into the floor of the cockpit. The rudder control unit is the to be laid, since it rests on the floor of the cockpit.

Fixing the rudder control unit and transmitting the commands of the rudder control unit to the rudder and/or the brakes takes place under the floor of the cockpit. This architecture is the result of a choice to communicate, in the case of a rudder control unit mechanically connected to the elements to be commanded (particularly the rudder), via the area under the floor (linkage via connecting rods, rotating sectors and cables), which is easier to achieve on an aircraft.

For the operation thereof, the rudder control unit must comprise a large number of pieces (hinges, connecting rods, pivots, etc.). Such a conventional rudder control unit, in particular due to this large number of pieces, is complex and is not optimal particularly in terms of spatial requirement, mass and cost.

To at least partially overcome these disadvantages, French patent 3 045 006 of the applicant discloses an actuating assembly for a rudder control unit which includes:
  at least one frame, provided with two rails, each of the rails having a concave curved shape; and
  associated with each of the rails, a mobile carriage, each of the mobile carriages carrying one of the pedals, each of the mobile carriages being configured such that it can be moved on the associated rail, for a direction command, under an action exerted by at least one foot of a pilot on at least one of the pedals.

Thus, this frame provided with curved (or curvilinear) rails on which the mobile carriages carrying the pedals can move, provides a more simplified architecture with a reduced number of pieces.

However, it is envisioned here to simplify the rudder control unit even further.

SUMMARY

The disclosure herein provides a rudder control unit new architecture which particularly makes it possible to further simplify the rudder control unit. It relates to a rudder control unit for an aircraft, the rudder control unit including at least one support frame intended to be mounted in a floor of the aircraft, pedals and a set of functionalities.

In the context of the disclosure herein, "set of functionalities" means all of the inherent functions of a rudder control unit.

According to the disclosure herein, the rudder control unit includes a main module comprising at least the pedals and the set of functionalities, the main module consisting of or comprising a single piece and being configured such that it can be moved and positioned on the support frame, using a movement unique unit.

In the context of the disclosure herein, "single-piece module" means a module that is made from a single piece or is unitary (i.e. which corresponds to a single object).

Thus, thanks to the disclosure herein, and particularly to the single-piece main module, which comprises the pedals and associated functionalities, a simplified architecture with a reduced number of pieces, as specified below, is obtained.

This architecture offers advantages particularly in terms of spatial requirement, mass and cost.

In a preferred embodiment, the support frame is provided with an inwardly curved upper face, making a concave curved shape, on which the main module can be moved.

Moreover, advantageously, the movement unit includes a unique assembly of two cooperating guide rails. Advantageously, each of the guide rails is shaped as a circular arc with a diameter greater than two meters.

Furthermore, advantageously, the movement unit includes rollers rotatably mounted under the main module. Advantageously, the movement unit includes at least four rollers positioned substantially at four corners of the main module and configured to be able to move, in pairs, in the two guide rails.

Preferably, the rollers are arranged such that the axes of rotation thereof are always oriented, regardless of the position thereof during a movement, along the radius of the circular arc at the corresponding position.

Moreover, in a specific embodiment, the movement unit also includes an adjusting system that can be commanded and configured to allow the adjustment of the position of the main module on the support frame.

Advantageously, the adjusting system comprises a geared motor that can be commanded and a command unit configured to command the geared motor. Preferably, the geared motor is mounted on the main module and can, when it is commanded, move, by an assembly of mechanical gears, cooperating with mechanical elements fixed on the support frame, the main module on the support frame.

Moreover, in a specific embodiment, the support frame is provided with visual marks and the main module is configured to be able to move above these visual marks.

Advantageously, the main module comprises a mirror arranged on a rear face, the mirror being positioned and oriented such as to allow reading, from a pilot position, of visual marks located in an area around the rear face of the main module.

Furthermore, in a specific embodiment, the support frame comprises a structure provided with closed cells.

The disclosure herein also relates to an aircraft, in particular a transport plane, which is provided with a rudder control unit like that described above.

In a preferred embodiment, for an aircraft provided with a cockpit supplied with a floor, the floor of the cockpit includes a raised part intended both to receive the support frame of the rudder control unit and to serve as a footrest for a pilot.

BRIEF DESCRIPTION OF THE DRAWINGS

The appended figures clearly explain how the disclosure herein can be carried out. In these figures, identical references refer to similar elements. More specifically.

DETAILED DESCRIPTION

Figure 1:
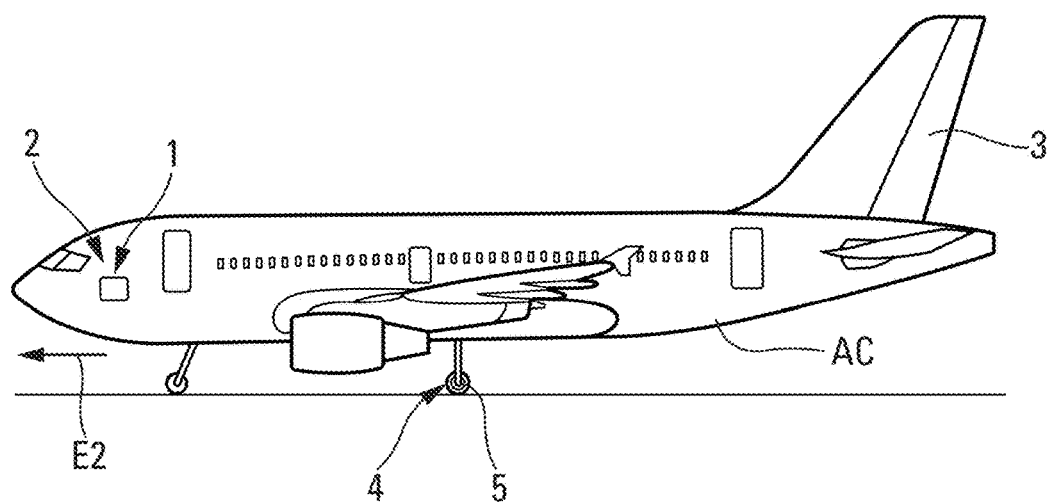
FIG. 1 shows a side view of a plane on the ground which includes a rudder control unit according to an embodiment of the disclosure herein.

FIG. 1 shows an aircraft AC, in this case a transport plane, which comprises a cockpit 2, in which a rudder control unit 1 according to the disclosure herein is arranged (as shown in an extremely simplistic manner in FIG. 1). The aircraft AC also includes a rudder 3 and brakes 4 at wheels 5 of a main landing gear of the aircraft AC.

Figure 2:
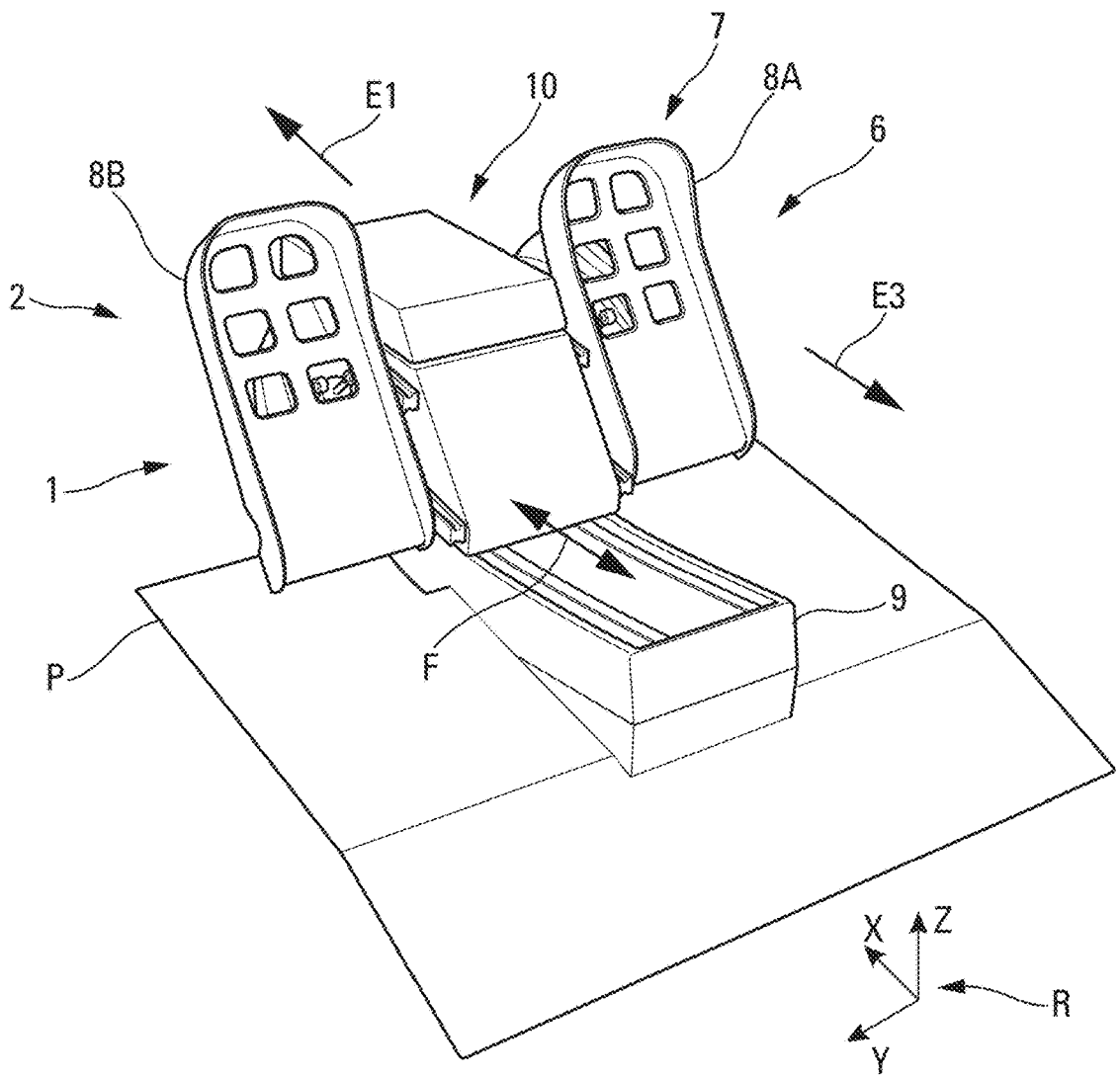
FIG. 2 is a perspective view of a rudder control unit seen from the rear.
Figure 3:
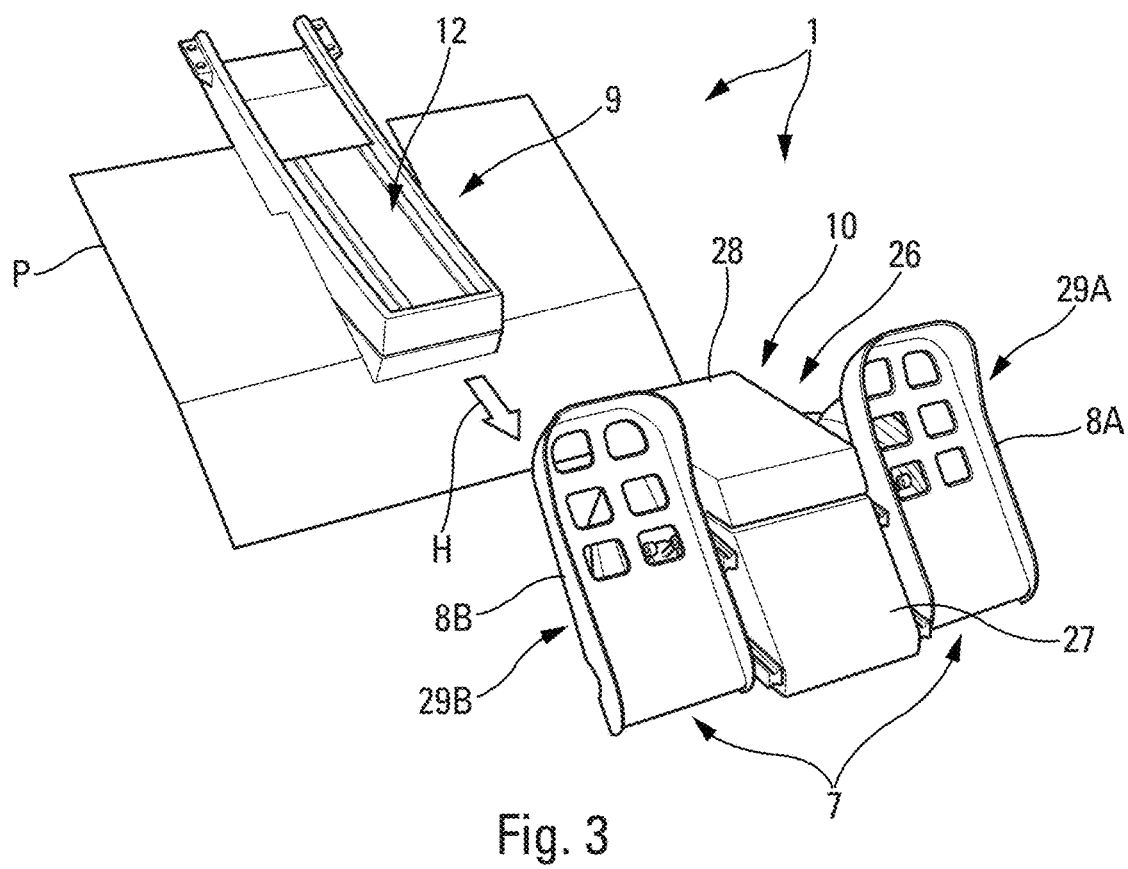
FIG. 3 is a perspective view, seen from the rear, of a rudder control unit, a main module of which is separated from a support frame.

FIGS. 2 and 3 show a rudder control unit 1 according to a preferred embodiment of the disclosure herein, which is arranged in the cockpit 2 (shown very partially) of the aircraft AC, by being integrated into the floor P of the cockpit 2.

In the context of the disclosure herein, the directions "rear" and "front" are defined with respect to the longitudinal direction of the aircraft AC, namely for "front" as illustrated in FIG. 2 by an arrow E1 toward the front of the aircraft AC (in the direction of an arrow E2 in FIG. 1) in the direction of flight (or movement) of the aircraft AC and for "rear" as illustrated in FIG. 2 by an arrow E3 toward the rear of the aircraft AC.

Moreover, in the context of the disclosure herein, the terms "lower", "upper", "low" and "high" are defined in a vertical direction Z which is orthogonal to a horizontal plane of the aircraft defined by the floor P (FIG. 2).

Moreover, to help with the description, FIG. 2 shows a reference system R (XYZ) having:

a longitudinal direction X in the longitudinal axis of the aircraft;

the vertical direction Z, the vertical direction Z forming, with the horizontal directional X, a plane XZ which is parallel to a vertical plane of symmetry of the aircraft; and a lateral direction Y orthogonal to the directions X and Z, the lateral direction Y forming, with the direction X, a plane XY which is parallel to the floor P of the cockpit 2 (FIG. 2).

In a conventional manner, the rudder control unit 1 of the aircraft AC is a piloting member which allows a pilot to control the rudder 3 (FIG. 1) such as to act upon the yaw axis of the aircraft during flight, and also to brake the aircraft AC when the latter is moving on the ground.

The rudder control unit 1, which is intended for a conventional transport plane, includes an actuation assembly 6 shown in FIG. 2, which can be actuated by a pilot, for example the senior pilot or a co-pilot of the aircraft. For this purpose, the rudder control unit 1 comprises a pair 7 of pedals. This pair 7 comprises two pedals 8A and 8B intended to be actuated by the two feet, right and left respectively, of the pilot.

For an aircraft piloted by two pilots, the rudder control unit 1 includes two actuation assemblies 6 like that of FIG. 2 for example, which are configured, in a conventional manner, such that the pedals intended for one of the pilots, the co-pilot for example, are always in the same position as those intended for the other pilot, the senior pilot for example.

The rudder control unit 1 includes at least one support frame 9 intended to be mounted in the floor P of the aircraft.

According to the disclosure herein, the rudder control unit 1 includes a main module 10 comprising at least the pedals 8A and 8B and a set of functionalities that are intended to operate the rudder control unit 1. The main module 10 consists of or comprises a single piece and is configured to be movable (as illustrated by the double-headed arrow F in FIG. 2) and positionable on the support frame 9, using a movement unique unit 11 described below.

The movement unit 11 (FIGS. 6 through 10) also makes it possible, in addition to the movement and positioning, to create a removable link between the main module 10 and the support frame 9. This removable link makes it possible to separate the main module 10 from the support frame 9, as shown in FIG. 3, rearwards in the direction illustrated by an arrow H.

Figure 5:
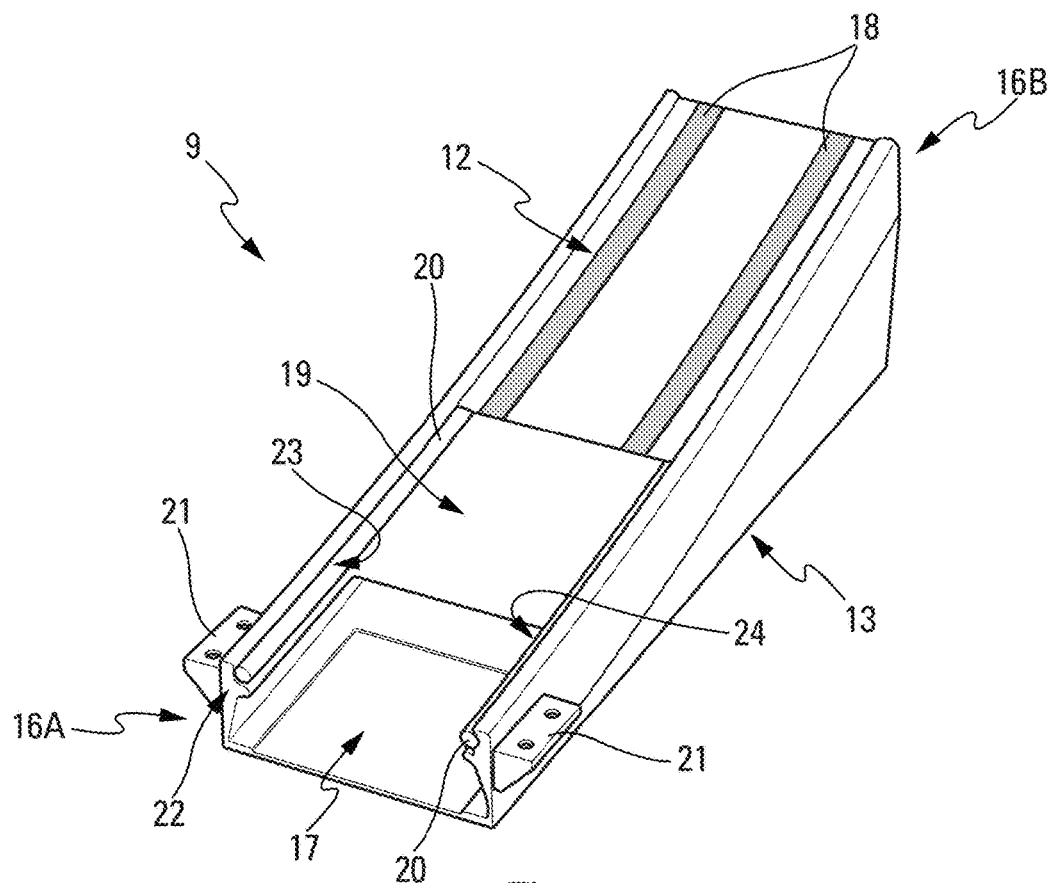
Figure 6:
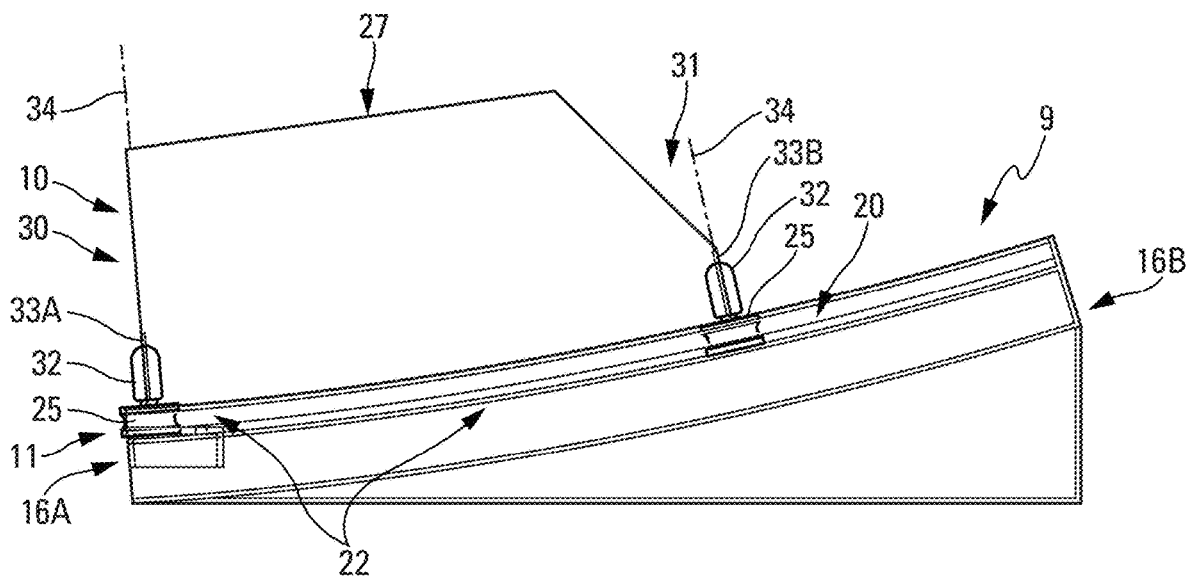
FIG. 6 is a schematic side view of the support frame.

In a preferred embodiment, the support frame 9 is provided with an inwardly curved upper face 12 (as depicted in FIGS. 5 and 6), making a concave curved shape, on which the main module 10 is moved. The support frame 9 also comprises, preferably, a flat bottom 13.

In a preferred embodiment, the floor P of the cockpit includes a raised part 14. This raised part 14 depicted particularly in FIG. 4 is intended to receive the support frame 9 of the rudder control unit 1 and also to serve as a footrest, to the right and to the left of the support frame 9, for the right and left feet, respectively, of a pilot (looking frontward) as depicted by arrows 15A and 15B.

Thus, thanks in particular to this support frame 9 of curved (or curvilinear) type, on which the main module 10 carrying the pedals 8A and 8B can be moved, a rudder control unit 1 simplified architecture with a reduced number of pieces is obtained. This architecture offers advantages particularly in terms of spatial requirement, mass and cost.

The support frame 9 is therefore, on the whole, elongated and has a concave curve general shape.

Figure 4:
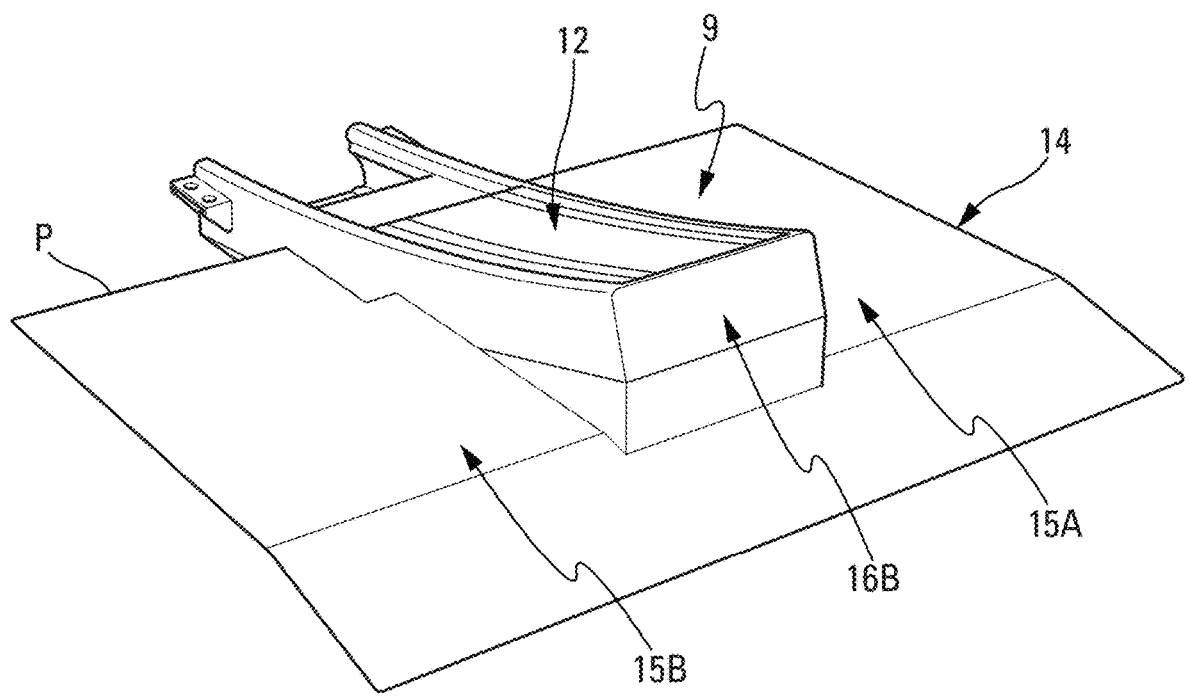
FIGS. 4, 5 and 7 show the support frame from different perspective views.

For this purpose, the support frame 9 is fixed in the plane XZ by having a general direction along X, while being curved (or inwardly curved) in a concave manner in the plane XZ such that the rear end 16B of the support frame 9 becomes distanced from the floor P vertically upward in the direction Z, as is depicted in FIGS. 4 and 5 in particular.

This curvature has the advantage of being able to position the main module 10 provided with the pedals 8A and 8B as ergonomically as possible according to the height of the pilots. Indeed, in a cockpit 2, the position of the pilots is defined with respect to the framing of the windows (external visibility) and with respect to the instrument panels (internal visibility angles). As a result, a tall pilot has a lower seating position and positions of pedals that are further pushed in and, from an ergonomic viewpoint, these pedals need to be positioned more vertically than for a small pilot, such as to provide an angle between the legs and the feet which is natural. Conversely, a small pilot is positioned higher on the seat and the pedals need to be positioned more horizontally. In a conventional hinged mechanical rudder control unit, these various positions are generally obtained by complex kinematics for positioning the pedals via a deformable parallelogram resetting the pedals precisely according to the ergonomics (the height mainly) of the pilots. This normally complex function is achieved very simply in the rudder control unit 1. Indeed, the simple concave curvature of the support frame 9 and thus of the rudder control unit 1 makes it possible to ergonomically position the main module 10 carrying the pedals 8A and 8B suitably with respect to the user.

As shown in FIG. 5, the support frame 9 includes:

in proximity to a front end 16A, a clearance 17 for unwinding front cabling (not shown);

anti-intrusion brushes 18 (particularly intended to prevent intrusion of dust);

an area 19 covered by the front end position of the main module 10;

lateral guide rails 20, intended for the rolling of rollers, as described below;

front elements 21 for fixing the support frame 9 to the raised part 14 of the floor P; and a rear interface (not shown) for fixing the support frame 9 to the raised part 14 of the floor P.

In a preferred embodiment, the support frame 9 is produced as a single-piece assembly. It can be manufactured using a method for 3D printing, for example in titanium.

It can also be produced from aluminum using a lost-wax casting method. In this case, guide rails (standard shaft made of hard metal) described below, are added to the support frame (tightfitting or by sticking).

This results in a support frame 9 which is rigid, light, simple, and which has a reduced mass and cost.

Figure 7:
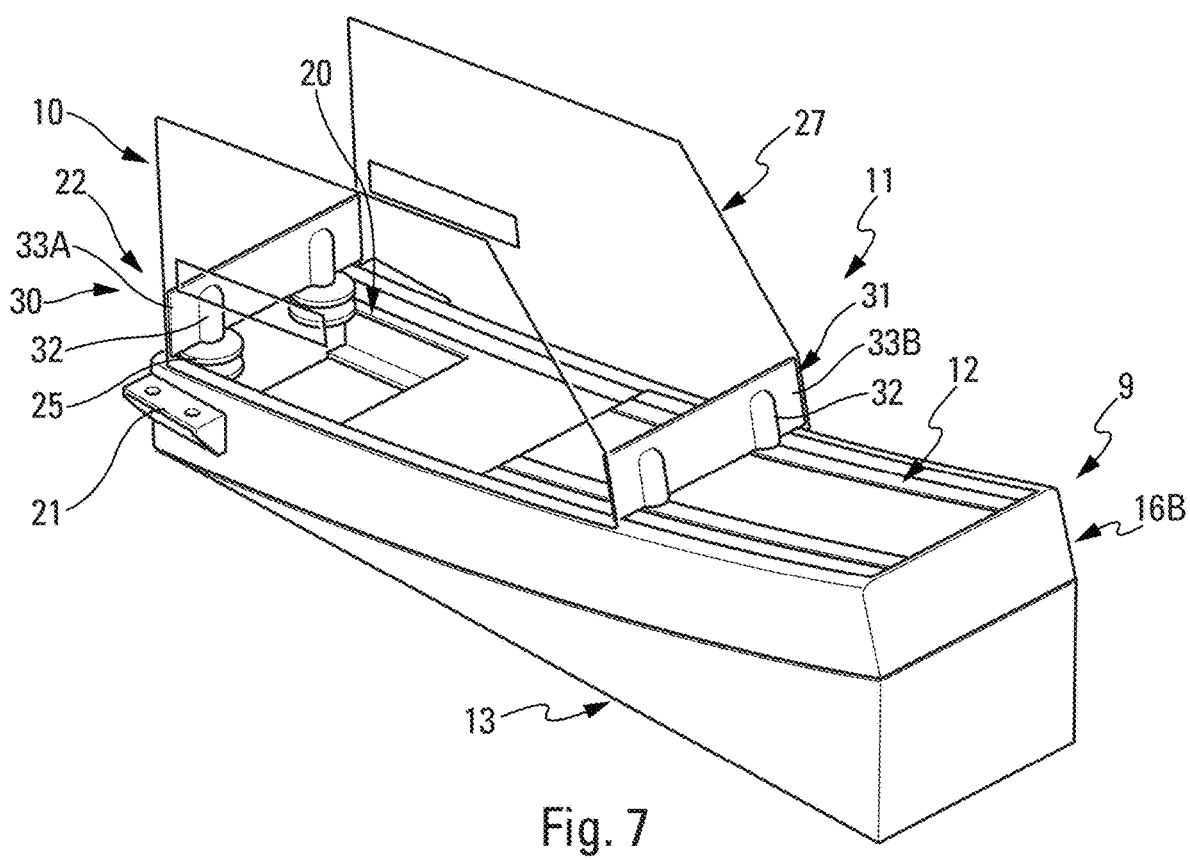
Figure 10:
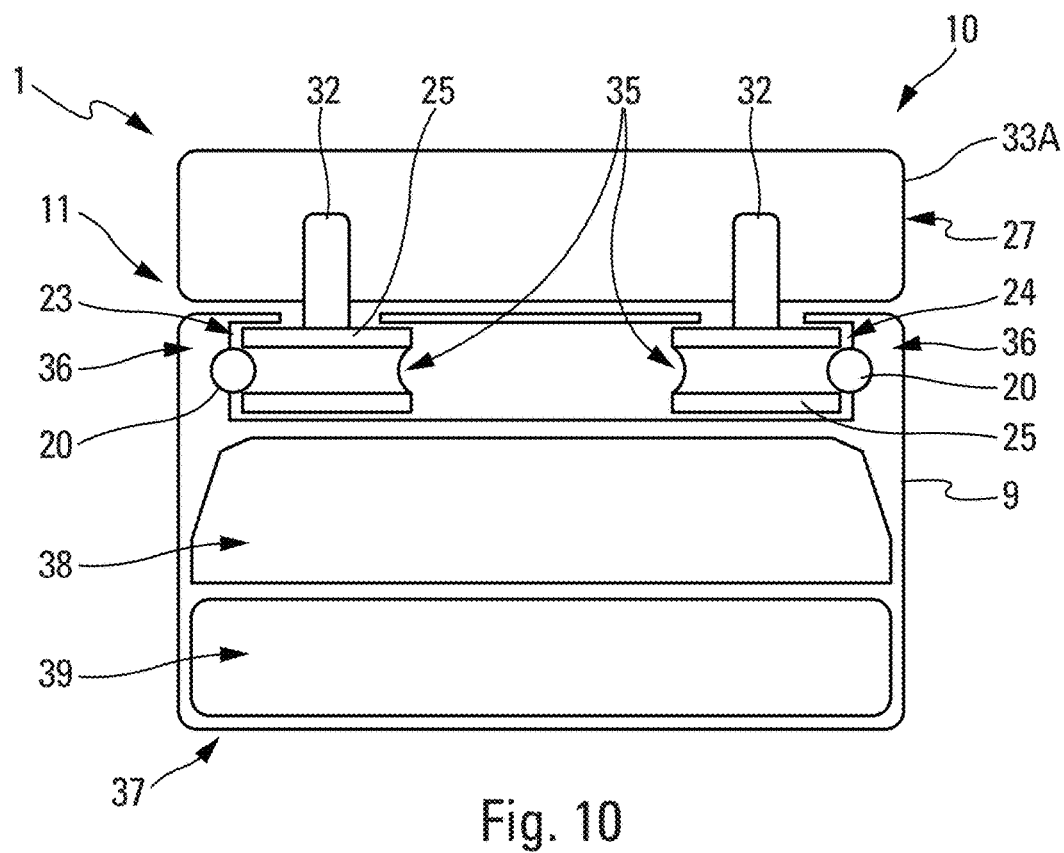

As shown in FIGS. 5 to 7, the movement unit 11 includes, on the support frame 9, a guide system 22 comprising a rail (unique) assembly, formed from the two opposite and cooperating guide rails 20. These two guide rails 20 are arranged toward the upper face 12 of the support frame 9, on opposite internal faces 23 and 24 of lateral walls (arranged along the axis X) of the support frame 9, as shown in FIGS. 5 and 10.

Each of the guide rails 20 is shaped as a circular arc with a diameter greater, for example, than two meters.

Furthermore, the movement unit 11 includes rollers 25 which are rotatably mounted under the main module 10. In a preferred embodiment, the main module 10 includes, as shown in particular in FIGS. 3 and 9, a central module 26 provided with a lower base module 27 and an upper auxiliary module 28 (FIG. 3). The main module 10 also includes two pedal modules 29A and 29B which are arranged on either side of the main module 10 in the direction Y and which each carry one of the pedals 8A and 8B.

The rollers 25 are mounted under the base module 27 of the main module 10. In the embodiment shown, the movement unit 11 includes four rollers 25 positioned substantially at the four corners of the lower wall of the base module 27 and configured to be able to move, in pairs, in the two opposite lateral guide rails 20.

As shown in FIGS. 6 and 7, the guide rollers 25 are integrated in a front face 30 and a rear face 31 of the base module 27, namely two rollers 25 on the front face 30 and two rollers 25 on the rear face 31, such as to be able to roll in the guide rails 20 fixed on the support frame 9.

The front and rear faces 30 and 31 (FIG. 6) of the base module 27 are placed radially with respect to the circle corresponding to the route described by the main module 10 during an ergonomic adjustment such as to adapt to the height of pilots, as is described hereafter.

The rollers 25 are fixed in reinforced plugs 32, which are rigidly connected to low areas 33A and 33B, which are mechanically reinforced, of the faces 30 and 31, as is shown in FIGS. 6 and 7.

These reinforced areas 33A and 33B transfer the forces coming from the rollers 25 directly into the front and rear faces 30 and 31 of the main module 10 (with a direct force path).

The rollers 25 are therefore arranged at the interface between the support frame 9 and the base module 27 of the main module 10. This arrangement mainly results in:

integrating the rollers 25 such that the axes of rotation thereof are arranged radially with respect to the curve of the support (and guide) frame 9, as described below;

creating a specific interface at the support frame 9 in order to take into account the reactions of the rollers 25, as is described below; and creating a box geometry of the base module 27 of the mobile main module 10, the roller 25 supporting front face 30 and rear face 31 of which are also radial with respect to the curve of the support frame 9.

Each of the guide (and rolling) rails 20 is produced, for example, as a shaft made of hard metal (steel, titanium, etc.) with a curved shape along a circular arc having a large diameter, for example approximately 2.4 meters. Moreover, each guide rail 20 is, for example, clamped onto the support frame 9 preferably made of light alloy.

Moreover, the rollers 25 are arranged such that the axes of rotation 34 thereof (FIG. 6) are always oriented, regardless of the position thereof during a movement along the guide rails 20, along the radius of the circle corresponding to the described route and more precisely the circle corresponding to the curvature of the guide rails 20.

The contact between a roller 25 and a guide rail 20 is a contact along the generator of the circular section or a localized contact if there is a reduced clearance. Each roller 25 is provided with a recess 35 suited to the cooperating guide rail 20, as shown in FIG. 10. Since the curvature of the guide circle is extremely large, there is no risk of interference, when the roller 25 rolls over the guide rail 20, between the guide rail 20 and elements of the roller 25.

During an action by the pilot on one of the pedals 8A and 8B, the pedal is pressed at the heal, i.e. at a low position, therefore relatively close to the rollers 25 (according to the direction Z). In this case:

in the plane XZ, the reactions on the rollers 25 in order to counter the produced moment are reduced, due to the large reaction lever arm;

the same applies in the plane XY; and in the plane YZ, the projections in this plane of the initial force of the pedal are extremely small and have little effect on the load balance.

In a preferred embodiment, shown in FIG. 10, the cross-section 37 of the support frame 9 is reinforced (in parallel with the plane YZ) perpendicular to the interfaces between the guide rails 20 and the rollers, as is illustrated by an arrow 36:

in order to provide robust clamping between the guide rails 20 and the support frame 9; and in order to absorb the produced lateral moments of the reaction forces between the guide rails 20 and the rollers 25.

In a specific embodiment, the support frame 9 comprises a structure provided with at least one closed cell.

The cross-section 37 of the support frame 9 is thus made up, preferably, of two closed cells 38 and 39 stacked in the direction Z, with the aim of rigidifying the cross-section, while optimizing the mass thereof.

The guiding action, by radial rollers 25 and curved guide rails 20, as is described above, offers many advantages. In particular:

the guide system 22 having guide rails 20 and rollers 25 allows for precise and robust guiding with few relevant parts, and it is simple; and the integration of the guide system 22 at the lower (hidden) part of the main module 10, provides:

a compactness, by remaining in the original casing of the mobile main module 10 and of the support frame 9;

a rigidity, due to the specific design of the cross-section 37 of the support frame 9 (specific reinforcements 36, closed cells 38 and 39) and the transfer of the forces as directly as possible into the elements suitable for resisting the latter;

a harmonious assembly, since the guide system 22 is not visible; and protection against external agents (dust, etc.) due to the reduced clearance existing at the interface between the main module 10 and the support frame 9. This clearance can, furthermore, be secured by a specific joint, and particularly by the brushes 18 (FIG. 5).

Furthermore, in the interface area between the rollers 25 and the base module 27 as shown in FIG. 7, the rollers 25 introduce reactions and moments in these interface areas at the plugs 32 of the reinforced areas 33A and 33B peripheral to the rollers. These loads are ideally introduced in the plane of the front and rear faces 30 and 31 of the main module 10 in order to particularly obtain the most direct force path possible.

Moreover, in a specific embodiment, the movement unit 11 includes an adjusting system 40 suitable for being commanded and configured in order to allow the adjustment of the position of the main module 10 on the support frame 9.

Figure 8:
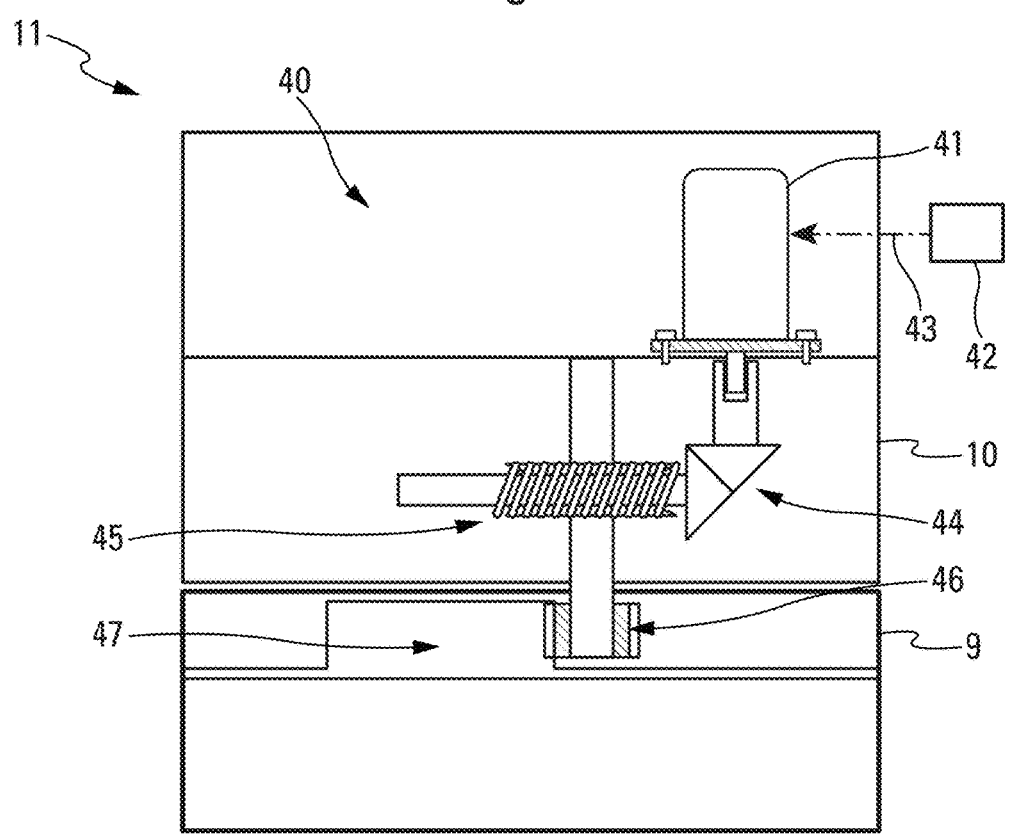
FIG. 8 is a schematic view of an adjusting system.
Figure 9:
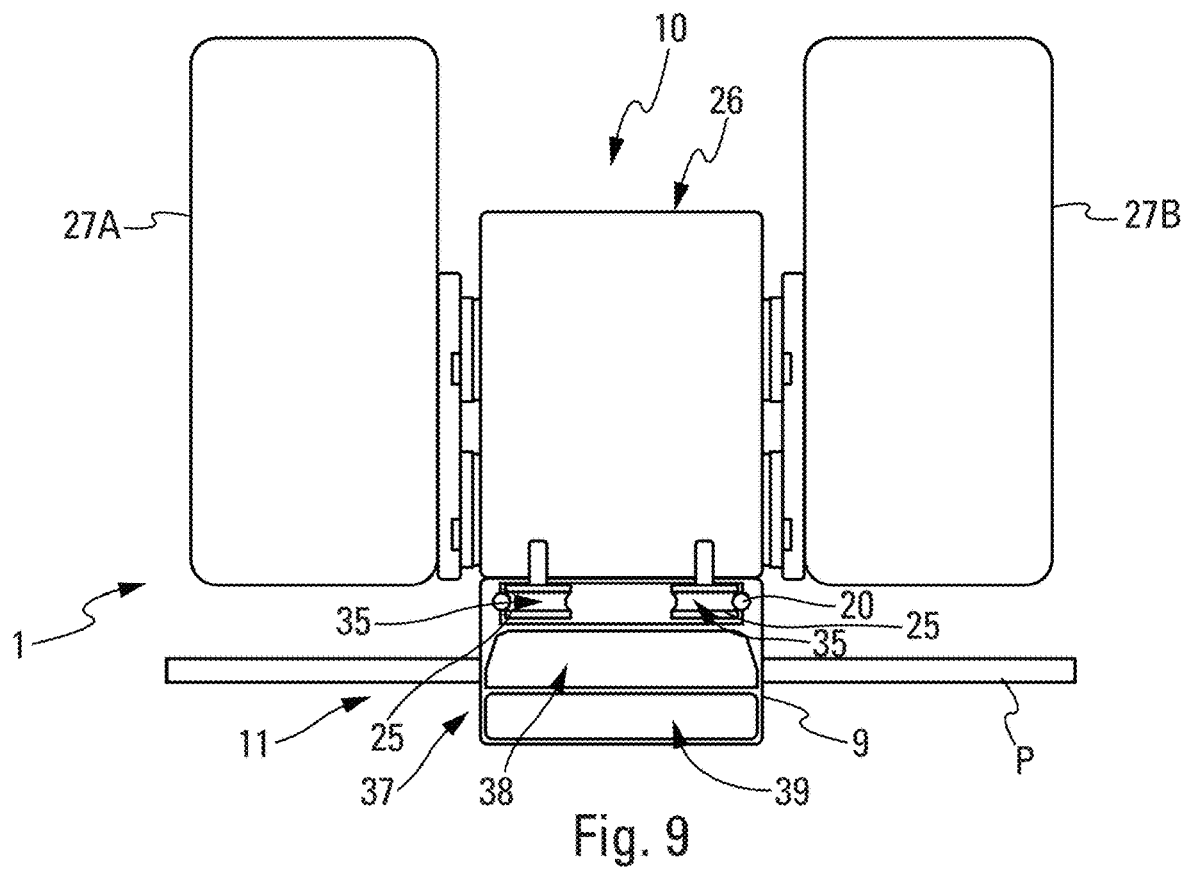
FIGS. 9 and 10 are schematic views for showing an arrangement of rollers of a guide system.

The adjusting system 40 comprises, as shown in an extremely simplistic manner in FIG. 8, a geared motor 41 suitable for being commanded and a command unit 42 configured to allow an operator, in particular a pilot, to command the geared motor 41, as illustrated in an extremely simplistic manner by a link 43 in dot and dash line.

The geared motor 41 is mounted on the main module 10 and it can, when it is commanded via the command unit 42, move, by an assembly of mechanical gears, cooperating with mechanical elements fixed on the support frame 9, the main module 10 on the support frame 9.

More precisely, as shown in FIG. 8, the adjusting system 40 includes:

an angle transmission 44 which is actuated by the geared motor 41 during the rotation generated by the latter;

a worm 45 linked to the angle transmission 44;

a wheel 46 driven by the worm 45; and a curved rack 47 on which the wheel 46 acts.

The curved rack 47 is a toothed sector, having an extremely large radius, provided on the support frame 9.

The positional adjustment, implemented by the adjusting system 40, is therefore carried out, via an electric command activating the geared motor 41, by a kinematic chain involving in sequence, after the command, the angle transmission 44, the worm 45, the wheel 46 and the curved rack 47.

This adjusting system 40 is configured to allow an operator, in particular a pilot of the aircraft, to modify the position of the main module 10 (and thus of the pedals 8A and 8B) on the support frame 9, as is illustrated by the arrow F in FIG. 2, with a movement implemented via the guide system 22.

The adjusting system 40 thus makes it possible to bring the main module 10 (and thus the pedals 8A and 8B) closer to or away from the seat of the pilot in order to adapt the position of these to the height of the pilot who will have to use them.

Unlike hinged conventional kinematics using pivots, ball joints, and bearings in particular, the linear guide kinematics of the main module 10, mobile on the fixed support frame 9, implemented by the movement unit 11, in order to change the position of the pedals with respect to the user when undertaking a flight assignment (ergonomic change mainly with respect to height) uses rollers 25 and guide rails 20. This technology is a proven technology resulting in simple and robust solutions.

Figure 11:
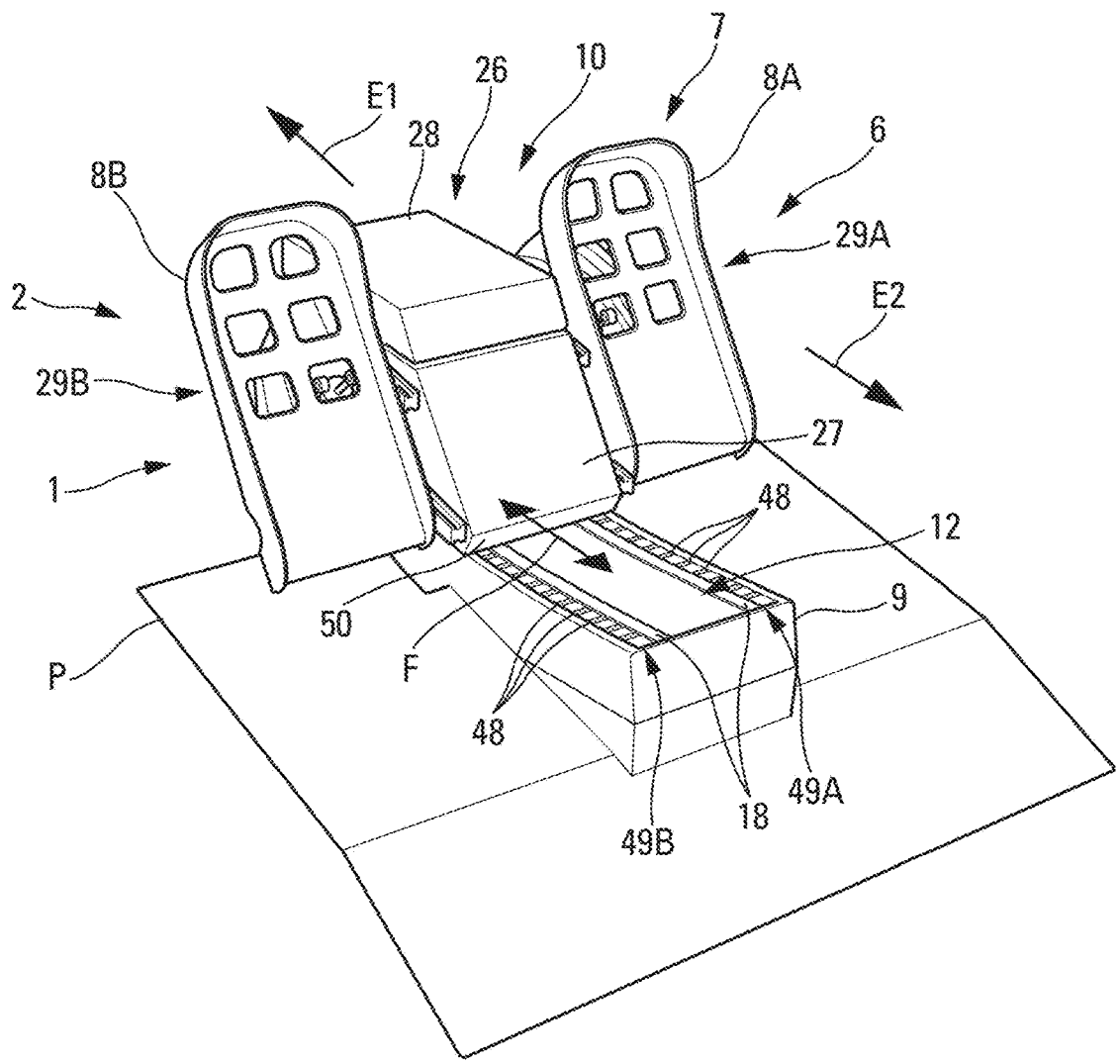
FIG. 11 is a figure similar to FIG. 2 showing visual marks arranged on the support frame.

Moreover, in a specific embodiment, the support frame 9 is provided with a plurality of visual marks 48, arranged next to one another along the upper face 12 of the support frame 9. Preferably, the visual marks 48 are arranged in two rows 49A and 49B next to the brushes 18, as is shown in FIG. 11. The main module 10 can move above these visual marks 48.

These visual marks 48 make it possible to locate the position of a rear face 51 (FIG. 12) of the base module 27 and therefore of the main module 10, along the support frame 9, which makes it possible to carry out a personal adjustment for each pilot.

Figure 12:
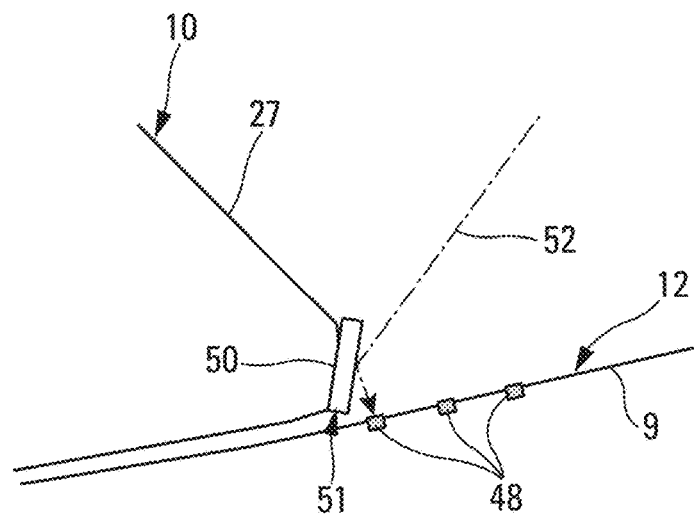
FIG. 12 is a schematic view for showing the positioning of a mirror with respect to visual marks.

In a specific embodiment, shown in FIGS. 11 and 12, the main module 10 comprises a mirror 50 arranged on the rear face 51 (inclined downward) of the base module 27. The mirror 50 is positioned and oriented such as to allow reading, from a pilot position, of the visual marks 48 located in an area around the rear face 51 of the base module 27.

Since the line of vision of the pilot is too oblique to allow for a precise direct indication of the position, the mirror 50 which is placed at the lower end of the mobile base module 27 and which is oriented such that the reading by the pilot is orthogonal to the indication as is illustrated by an arrow 52, makes it possible to precisely read the visual marks 48. The visual marks 48 can be made simply (using a visible paint, for example phosphorescent) or be luminous. The mirror 50 can also benefit from a passive or active light source, coming from the cockpit environment.

The rudder control unit 1, as described above, particularly has the following features:

a mobile base module 10 moving on a fixed support frame 9 used as a guide, by the guide system 22;

once at the position chosen by the pilot via the adjusting system 40, the base module 10 no longer moves on the support frame 9, which mainly has a support and guide structural function;

the support (and guide) frame 9 visually blends in with the structural environment and the layout of the cockpit 2; and the support frame 9 does not need to be removed for maintainability, following a failure of any active function of the rudder control unit 1, present in the main module 10.

As a result:

all of the mobile kinematic devices and of the systems are almost exclusively grouped together in and on the main module 10; and the support (and guide) frame 9, once the ergonomic adjustment has been carried out, only has a mainly structural role (holding fixed support for the main module 10.

The rudder control unit 1 architecture, as described above, offers many advantages. In particular:

it has a simplified construction and it uses a reduced number of pieces. This results in a saving in mass and a substantial simplification;

it also offers facilitated integration of the rudder control unit 1 and of the associated elements;

it offers a reduced spatial requirement, and a reduced cost; and it offers a simplified use with electric adjustment (for positioning the main module 10 on the support frame 9.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rudder control unit for an aircraft, the rudder control unit comprising:
   at least one support frame mountable in a floor of the aircraft, pedals and a set of functionalities; and
   a main module comprising at least the pedals and the set of functionalities, the main module comprising a single piece and being configured such that it is movable and positioned on the support frame using a movement unique unit
   wherein the support frame comprises an inwardly curved upper face, making a concave curved shape, on which the main module can be moved.

2. The rudder control unit of claim 1, wherein the movement unique unit comprises a unique assembly of two cooperating guide rails.

3. The rudder control unit of claim 2, wherein each of the guide rails is shaped as a circular arc with a diameter greater than two meters.

4. The rudder control unit of claim 2, wherein the movement unique unit comprises rollers rotatably mounted under the main module.

5. The rudder control unit of claim 4, wherein the movement unique unit includes at least four rollers positioned substantially at four corners of the main module and movable, in pairs, in the two guide rails, respectively.

6. The rudder control unit of claim 5, wherein the rollers are arranged such that axes of rotation thereof are always oriented, regardless of position thereof during a movement, along a radius of the circular arc at the corresponding position.

7. The rudder control unit of claim 1, wherein the movement unique unit includes an adjusting system that can be commanded and configured to allow adjustment of a position of the main module on the support frame.

8. The rudder control unit of claim 7, wherein the adjusting system comprises a geared motor that can be commanded and a command unit configured to command the geared motor.

9. The rudder control unit of claim 8, wherein the geared motor is mounted on the main module and can, when commanded, move, by an assembly of mechanical gears, cooperating with mechanical elements fixed on the support frame, the main module on the support frame.

10. The rudder control unit of claim 1, wherein the support frame is provided with visual marks and wherein the main module is movable above the visual marks.

11. The rudder control unit of claim 10, wherein the main module comprises a mirror on a rear face, the mirror being positioned and oriented to allow reading, from a pilot position, of visual marks located in an area around the rear face of the main module.

12. The rudder control unit of claim 1, wherein the support frame comprises a structure with closed cells.

13. An aircraft comprising a rudder control unit of claim 1.

14. The aircraft of claim 13, comprising a cockpit with a floor, and wherein the floor of the cockpit includes a raised part to receive the support frame of the rudder control unit and to serve as a footrest for a pilot.

15. A rudder control unit for an aircraft, the rudder control unit comprising:
   at least one support frame mountable in a floor of the aircraft, pedals and a set of functionalities; and
   a main module comprising at least the pedals and the set of functionalities, the main module comprising a single piece and being configured such that it is movable and positioned on the support frame using a movement unique unit;
   wherein the movement unique unit comprises a unique assembly of two cooperating guide rails; and wherein:
      each of the guide rails is shaped as a circular arc with a diameter greater than two meters; and/or
      the movement unique unit comprises rollers rotatably mounted under the main module.

16. The rudder control unit of claim 15, wherein the movement unique unit includes at least four rollers positioned substantially at four corners of the main module and movable, in pairs, in the two guide rails, respectively.

17. An aircraft comprising a rubber control unit of claim 15.

18. A rudder control unit for an aircraft, the rudder control unit comprising:
   at least one support frame mountable in a floor of the aircraft, pedals and a set of functionalities; and
   a main module comprising at least the pedals and the set of functionalities, the main module comprising a single piece and being configured such that it is movable and positioned on the support frame using a movement unique unit;
   wherein the movement unique unit includes an adjusting system that can be commanded and configured to allow adjustment of a position of the main module on the support frame; and
   wherein the adjusting system comprises a geared motor that can be commanded and a command unit configured to command the geared motor.

19. The rudder control unit of claim 18, wherein the geared motor is mounted on the main module and can, when commanded, move, by an assembly of mechanical gears, cooperating with mechanical elements fixed on the support frame, the main module on the support frame.

20. An aircraft comprising a rubber control unit of claim 18.

* * * * *